(12) United States Patent
Liu et al.

(10) Patent No.: US 12,159,486 B1
(45) Date of Patent: Dec. 3, 2024

(54) HUMAN-ROBOT COLLABORATION METHOD BASED ON MULTI-SCALE GRAPH CONVOLUTIONAL NEURAL NETWORK

(71) Applicant: Yantai University, Yantai (CN)

(72) Inventors: Zhaowei Liu, Yantai (CN); Xilang Lu, Yantai (CN); Wenzhe Liu, Yantai (CN); Hang Su, Yantai (CN); Jindong Xu, Yantai (CN); Yongchao Song, Yantai (CN); Anzuo Jiang, Yantai (CN)

(73) Assignee: Yantai University, Yantai (CN)

( * ) Notice: Subject to any disclaimer, the term of this patent is extended or adjusted under 35 U.S.C. 154(b) by 0 days.

(21) Appl. No.: 18/781,538

(22) Filed: Jul. 23, 2024

(30) Foreign Application Priority Data

Aug. 2, 2023 (CN) .......................... 202310959781.6

(51) Int. Cl.
*G06V 40/20* (2022.01)
*G06N 3/042* (2023.01)
(Continued)

(52) U.S. Cl.
CPC ............. *G06V 40/20* (2022.01); *G06N 3/042* (2023.01); *G06N 3/0464* (2023.01); *G06N 3/08* (2013.01); *G06V 10/764* (2022.01); *G06V 10/82* (2022.01)

(58) Field of Classification Search
CPC ...... G06V 40/20; G06V 10/764; G06V 10/82; G06N 3/042; G06N 3/0464; G06N 3/08
See application file for complete search history.

(56) References Cited

U.S. PATENT DOCUMENTS

2021/0073525 A1* 3/2021 Weinzaepfel .......... G06V 10/82
2022/0366244 A1* 11/2022 Vandeventer ...... G06Q 10/0639

FOREIGN PATENT DOCUMENTS

CN 113343901 * 9/2021 ............. G06N 3/045
CN 113343901 A 9/2021
(Continued)

OTHER PUBLICATIONS

Yeong et al, ("Ensemble Three-Stream RGB-S Deep Neural Network for Human Behavior Recognition Under Intelligent Home Service Robot Environments", May 24, 2021, IEEE, Digital Object Identifier 10.1109/ACCESS.2021.3077487) (Year: 2021).*
(Continued)

*Primary Examiner* — Amara Abdi
(74) *Attorney, Agent, or Firm* — Nitin Kaushik

(57) ABSTRACT

The present invention discloses a human-robot collaboration method based on a multi-scale graph convolutional neural network. The method includes the following steps: S1, data acquisition: acquiring a dataset of a human skeleton in human-robot collaboration scenes, and performing pre-processing to obtain pre-processed data; S2, model training: loading the pre-processed data, and obtaining a human behavior recognition network model by training a multi-scale graph convolutional neural network; S3, human behavior recognition: predicting human behaviors through a trained deep learning network model; and S4, human-robot interaction: sending predicted information to a robot system through a communication algorithm, and enabling a robot to make action plans based on the human behaviors. By the human-robot collaboration method based on a multi-scale graph convolutional neural network disclosed by the present invention, a robot can predict human behaviors and intents in real scenes and make correct interaction.

4 Claims, 2 Drawing Sheets

(51) Int. Cl.
*G06N 3/0464* (2023.01)
*G06N 3/08* (2023.01)
*G06V 10/764* (2022.01)
*G06V 10/82* (2022.01)

(56) References Cited

FOREIGN PATENT DOCUMENTS

| CN | 113657349 | * | 11/2021 | ......... G06F 18/2415 |
| CN | 114582030 | * | 6/2022 | ........... G06F 18/214 |
| CN | 114582030 A | | 6/2022 | |
| CN | 114821640 | * | 7/2022 | ........... G06F 18/253 |
| CN | 114821640 A | | 7/2022 | |

OTHER PUBLICATIONS

Akash et al, ("Human Action Recognition using Skeleton features", 2022 IEEE, International Symposium on Mixed and Augmented Reality Adjunct), (Year: 2022).*

Dadithota et al, ("Human Action Recognition based on Depth maps, Skeleton and Sensor Images using Deep Learning", 2022 IEEE 3rd Global Conference for Advancement in Technology (GCAT) Bangalore, India. Oct. 7-9, 2022 (Year: 2022).*

* cited by examiner

HUMAN-ROBOT COLLABORATION METHOD BASED ON MULTI-SCALE GRAPH CONVOLUTIONAL NEURAL NETWORK

CROSS-REFERENCE TO RELATED APPLICATIONS

The application claims priority to Chinese patent application No. 202310959781.6, filed on Aug. 2, 2023, the entire contents of which are incorporated herein by reference.

TECHNICAL FIELD

The present invention relates to the field of robots and computer vision, exactly a human-robot collaboration method based on a multi-scale graph convolutional neural network.

BACKGROUND

With rapid advancement of a robot technology, robots can operate effortlessly in various challenging environments, effectively solving the problem of manpower shortage. However, despite significant progress in automated task execution, the robots still heavily rely on pre-programming to perform specific tasks. The dependency may limit the flexibility of the robots and the ability to perform complex actions that are relatively easy for humans. Therefore, with the increasing demand for the robots to perform fine and flexible tasks in complex environments, people are increasingly in need of collaborative robots to bridge the gap in human-robot interaction.

According to existing technical searches, CN113657349A-a human behavior recognition method based on a multi-scale spatio-temporal graph convolutional neural network, belongs to the technical field of a neural network. The method includes: extracting a human skeleton sequence to be recognized, creating a dataset, and performing preprocessing; creating a deep neural network model that includes a multi-scale graph convolution module and a multi-duration feature fusion module, and enabling the model to better extract spatial features of human bones and time sequence features of bone sequences; training and testing the deep neural network to obtain a human behavior recognition neural network model; and classifying the video images to be recognized by using the trained model, and outputting classification results. The human behavior recognition method provided by the present invention can enable the neural network model to better extract spatio-temporal features of bone sequences, achieve automatic recognition of human behaviors, and improve the accuracy of human behavior recognition.

A collaborative robot is a type of robots that work with humans, which utilizes human cognitive abilities to adapt to constantly changing situations and completes tasks that robots find difficult to independently accomplish, thereby helping to overcome the limitations of pre-programming. Herein, a human behavior recognition technology plays a crucial role.

SUMMARY

In view of the above problem, the present invention proposes a human-robot collaboration method based on a multi-scale graph convolutional neural network to overcome defects and shortcomings of existing human-robot interaction methods.

To resolve the foregoing technical problem, the following technical means are used in the present invention:

the human-robot collaboration method based on a multi-scale graph convolutional neural network, includes the following steps:

S1, data acquisition: acquiring a dataset of a human skeleton in human-robot collaboration scenes, and performing pre-processing to obtain pre-processed data;

S2, model training: loading the pre-processed data, and obtaining a human behavior recognition network model by training a multi-scale graph convolutional neural network;

S3, human behavior recognition: predicting human behaviors through a trained deep learning network model; and S4, human-robot interaction: sending predicted information to a robot system through a communication algorithm, and enabling a robot to make action plans based on the human behaviors.

Preferably, the present invention has a further technical solution as follows:

in data acquisition, a specific process of acquiring a dataset of a human skeleton in human-robot collaboration scenes is;

Step 1: data acquisition: shooting videos of different categories of human actions by using a RGB camera, and reducing a resolution of the obtained videos to 340*256 by a video processing algorithm, with a frame rate of 30 frames;

Step 2: converting video data: to expand the dataset, mirroring each dataset to obtain final human behavior video data;

Step 3: obtaining key points: extracting human skeleton data for each video by using skeleton extraction API provided by OpenPose, and labeling the category of each skeleton, where each human skeleton contains 18 key points; and Step 4: data classification: using 80% of the extracted skeleton data as a training dataset and 20% as a testing dataset.

In model training, constructing the multi-scale graph convolutional neural network model includes the following steps:

Step 1: a graph structure is constructed: the graph structure of skeleton data is constructed;

Step 2: a human behavior recognition network is constructed: the network contains 9 multi-scale spatio-temporal convolutional blocks, and each block contains a multi-scale spatial graph convolutional network and a temporal attention convolutional network;

Step 3:9 multi-scale spatio-temporal convolutional blocks: the first three multi-scale spatio-temporal convolutional blocks have 64 output channels, the next three multi-scale spatio-temporal convolutional blocks have 128 output channels, and the last three multi-scale spatio-temporal convolutional blocks have 256 output channels; and Step 4: action categories are predicted: outputting is performed by using global pooling, obtained tensors are input into a fully connected layer with the same number of output channels as the categories, and finally the action categories are predicted.

The graph structure of the skeleton data is constructed in the step of constructing the graph structure, the skeleton data is defined as a vector sequence consisting of two-dimensional coordinates of a skeleton of each frame, a skeleton graph is defined as $G=(V, E)$, where a joint point set $V=\{V_1, \ldots, V_N\}$ represents a set of N joint points, the skeleton between the joint points is represented by undirected edges, and an edge set E is formed, representing the human skeleton structure; for an adjacency matrix $A \in R^{N \times N}$ of an undirected graph, when edges exist between the joint points $V_i$ and $V_j$, $A_{ij}=1$, or else $A_{ij}=0$;

human behavior consists of a set of skeleton sequences, thereby skeleton input is defined as a matrix: $X \in R^{T \times N \times C}$, where T is the number of frames of input videos, N is the number of joints (N=18), and C is a dimension of an eigenvector; To aggregate information from adjacent nodes, spatial GCN of time t can be defined as:

a) $X_t^{(l+1)} = \sigma\left(\tilde{D}^{-\frac{1}{2}} \tilde{A} \tilde{D}^{-\frac{1}{2}} X_t^{(l)} W^l\right)$, where $\tilde{A}=A+I$ is an adjacency matrix with an additional self-loop, used to maintain characteristics of the node itself; a diagonal matrix $\tilde{D}$ is obtained by calculating degrees of the nodes, $$\tilde{D}^{-\frac{1}{2}} \tilde{A} \tilde{D}^{-\frac{1}{2}}$$

is used for normalizing A, and $W \in R^{C_l C_{l+1}}$ is a learnable weight matrix; node neighbors perform feature aggregation through $$\tilde{D}^{-\frac{1}{2}} \tilde{A} \tilde{D}^{-\frac{1}{2}} X_t^{(l)},$$

and then functions are activated through $\sigma$ to obtain output;

to aggregate the features of multi-order neighbor nodes of the skeleton, multi-order node connection is created, and high-order neighbors of the nodes are merged into the network; high-order neighbor information is obtained through $\tilde{A}_k$, where $\tilde{A}_k = A^k + I$; to solve the problem of excessive weights of local neighbors of the nodes caused by multi-scale aggregation of high-order polynomials, for a high-order adjacency matrix, $A_{i,j}$ greater than 1 is replaced with 1 to update an adjacency matrix $\hat{A}_k=1$ ($\tilde{A}_k \geq 1$), whereby a multi-scale strategy is transformed into $\hat{A}_k=1(\tilde{A}_k \geq 1)$ to eliminate the problem of excessive weighting of neighbor nodes, $$X_t^{(l+1)} = \sigma\left(\sum_{k=0}^{k} \hat{D}_{(k)}^{-\frac{1}{2}} \hat{A} \hat{D}_{(k)}^{-\frac{1}{2}} X_t^{(l)} W_{(k)}^{(l)}\right),$$

where k determines the size of scales, and $$\hat{D}_{(k)}^{-\frac{1}{2}} \hat{A}_{(k)} \hat{D}_{(k)}^{-\frac{1}{2}}$$

is a standardized nearest neighbor;

for construction of the temporal attention convolutional network in the human behavior recognition network, a temporal attention module is: for any node $v \in V$, a time sequence vector $s_i \in S=\{s_i, \ldots, S_T\}$, query $q \in R^{d_q}$, key $k \in R^{d_k}$, and a value $v \in R^{d_v}$ exist;

for the node $v_m$, the weight of a link between a $i^{th}$ frame and a $j^{th}$ frame can be evaluated through a dot product $\lambda_{ij}^m = q_i^m \cdot k_j^m \forall i, j=1, \ldots, T$;

to obtain final temporal attention embedding of a node, firstly value vectors $v_j$ of all other frames are multiplied with corresponding evaluation scores $\lambda_{ij}$, then a product is scaled using a softmax function, and a weighted sum is calculated to obtain the temporal attention embedding $z_i^m \in R^{C_1}$ of each node, where C' is the number of the output channels;

attention embedding is represented as:

$$z_i^m = \sum_j \text{softmax}_j\left(\frac{\lambda_{ij}^m}{\sqrt{d_k}}\right) v_j^m,$$

where $d_k$ is the dimension of a key sequence, and the evaluation score is divided by $\sqrt{d_k}$ to improve gradient stability;

before a self-attention module is input, firstly the outputs $\tilde{X} \in R^{B \times C \times T \times V}$ are converted into $\tilde{X} \in R^{BV \times T \times C}$, where B is a batch size of input, and in addition, the batch size B and the number V of joints are merged into one dimension;

then the transformed output is transferred to a self-attention block to obtain attention embedding; and then, a 2D convolutional network is used for performing temporal feature aggregation on each node with a window size of t.

In human behavior recognition, a process of human behavior recognition is:

Step 1: recognizing a model: based on the human behaviors trained during model training, recognizing the model;

Step 2: acquiring video data: deploying the RGB camera to a production environment, and acquiring the video data from the production environment;

Step 3: extracting the human skeleton: extracting the human skeleton from the video by using the skeleton extraction API in the OpenPose; and Step 4: outputting predicted results: inputting the skeleton into the model and outputting the predicted results.

A process of human-robot interaction is:

Step 1: language system: where a human recognition model is based on python language, and the robot is based on an ROS system;

Step 2: communication connection: using a UDP protocol package in a Socket library to establish communication connection between a computer and the robot system;

Step 3: data interaction: sending action results predicted by a human recognition model in human behavior recognition to the robot system at the same speed as 30 frames of video frame rate, establishing UDP monitoring by the robot system, and receiving category information sent by the computer; and Step 4: predefinition setting: enabling the robot to make interaction based on the category of human actions, and executing corresponding interaction actions, where the interaction actions of the robot are predefined.

The present invention relates to the human-robot collaboration method based on a multi-scale graph convolutional neural network. A human behavior recognition technology can help robots adapt to constantly changing work environments. In complex environments, tasks and scenarios may change at any time, and traditional pre-programming methods often cannot adapt to these changes. However, by recognizing and analyzing human behaviors in real time, the robots can quickly adapt to environment changes and take corresponding actions. The flexibility enables the robots to collaborate with humans in dynamic and unknown situations, improving working efficiency and increasing task completion rate.

DETAILED DESCRIPTION OF THE EMBODIMENTS

The present invention will be further described with reference to embodiments.

Figure 1:
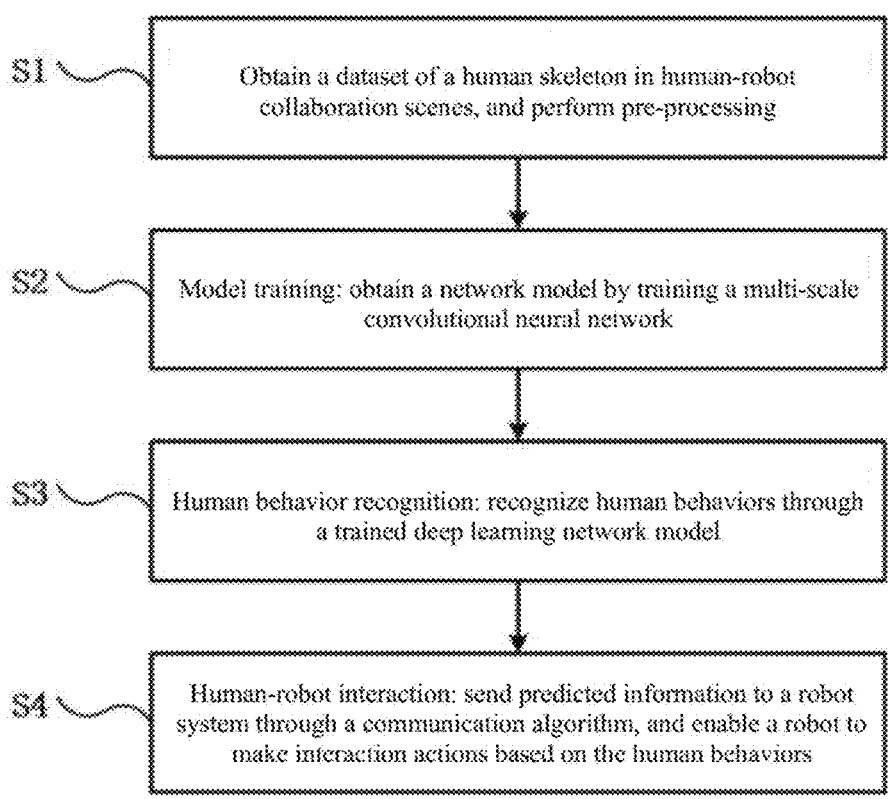
FIG. 1 shows a flowchart diagram of a human-robot interaction method based on a multi-scale graph convolutional neural network of the present invention.

Specific Embodiment 1 with reference to FIG. 1, it can be seen that the specific embodiment:

As shown in FIG. 1, a human-robot interaction method based on a multi-scale graph convolutional neural network includes:

S1, acquiring a dataset of a human skeleton in human-robot collaboration scenes, and performing pre-processing;

S2, model training: obtaining a human behavior recognition network model by training a multi-scale graph convolutional neural network;

S3, human behavior recognition: predicting human behaviors through a trained deep learning network model; and S4, human-robot interaction: sending predicted information to a robot system through a communication algorithm, and enabling a robot to make action plans based on the human behaviors.

Figure 2:
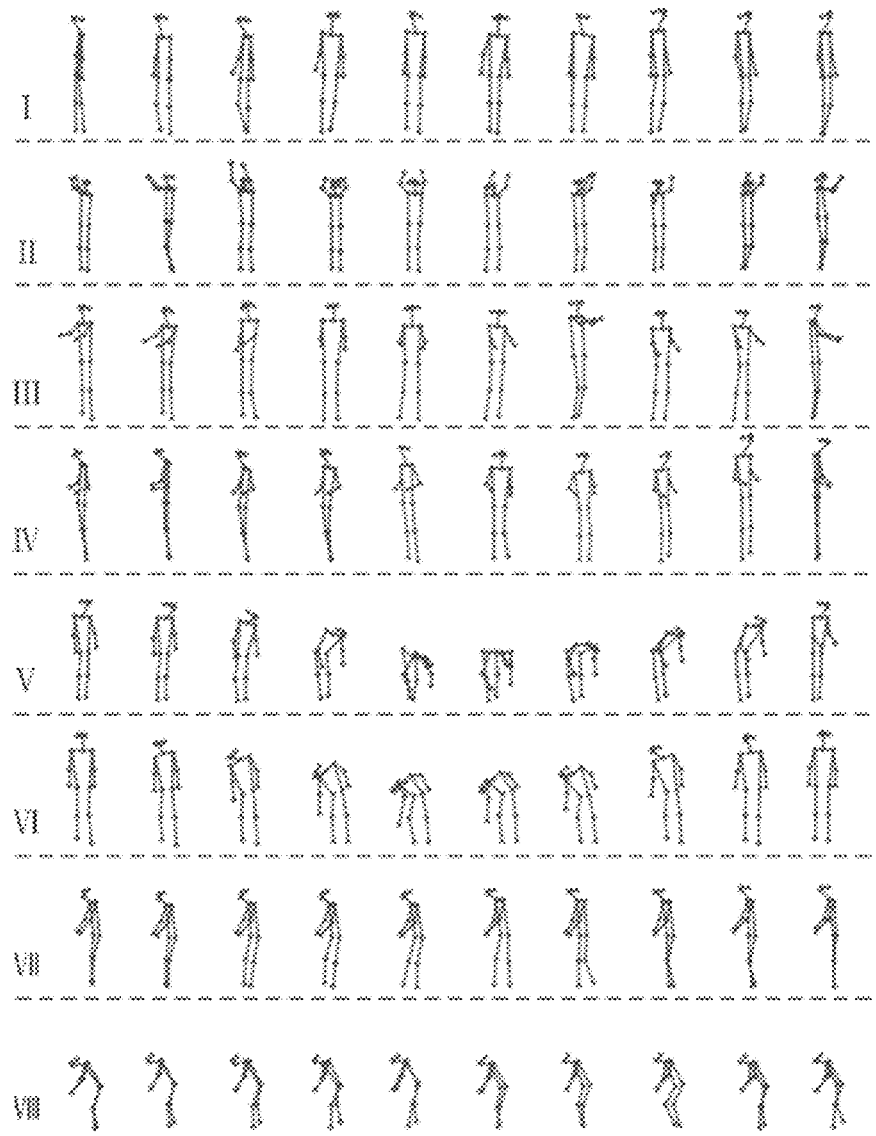
FIG. 2 shows visualization of a dataset for a human behavior recognition skeleton.

Acquiring the dataset of the human skeleton in S1 specifically includes:

determining action categories in 8 industrial scenarios, which are: 1) being stationary; 2) holding a box high; 3) passing the box forward; 4) supporting the box; 5) moving the box; 6) lifting the box; 7) pulling the box; and 8) pushing the box. Videos of above categories of human actions are shot by using a RGB camera, and a resolution of the obtained videos is reduced to 340*256 by a video processing algorithm, with a frame rate of 30 frames. To expand the dataset, each dataset is mirrored to obtain final human behavior video data, 1600 videos in total. Human skeleton data for each video is extracted by using skeleton extraction API provided by OpenPose, and the category of each skeleton is labeled, where each human skeleton contains 18 key points, and acquired human skeleton is shown in FIG. 2. 80% of the extracted skeleton data is used as a training dataset and 20% as a testing dataset.

Constructing the multi-scale graph convolutional neural network model at S2 specifically includes:

firstly, constructing a graph structure of the skeleton data, and then constructing a human behavior recognition network, where the network contains 9 multi-scale spatio-temporal convolutional blocks, and each block contains a multi-scale spatial graph convolutional network and a temporal attention convolutional network; and where the first three multi-scale spatio-temporal convolutional blocks have 64 output channels, the next three multi-scale spatio-temporal convolutional blocks have 128 output channels, and the last three multi-scale spatio-temporal convolutional blocks have 256 output channels. Final outputting is performed by using global pooling, obtained tensors are input into a fully connected layer with the same number of output channels as the categories, and finally the action categories are predicted.

The skeleton data is defined as a vector sequence consisting of two-dimensional coordinates of a skeleton of each frame. Therefore, a skeleton graph is defined as G=(V, E), where a joint point set V={$V_1, \ldots, V_N$} represents a set of N joint points, the skeleton between the joint points is represented by undirected edges, and an edge set E is formed, representing the human skeleton structure. For an adjacency matrix $A \in R^{N \times N}$ of an undirected graph, when edges exist between the joint points $V_i$ and $V_j$, $A_{ij}$=1, or else $A_{ij}$=0. Human behavior consists of a set of skeleton sequences, thereby skeleton input is defined as a matrix: $X \in R^{T \times N \times C}$, where T is the number of frames of input videos, N is the number of joints (N=18), and C is a dimension of an eigenvector. To aggregate information from adjacent nodes, spatial GCN of time t can be defined as:

$$X_t^{(l+1)} = \sigma\left(\tilde{D}^{-\frac{1}{2}} \tilde{A} \tilde{D}^{-\frac{1}{2}} X_t^{(l)} W^l\right),$$

where Ã=A+I is an adjacency matrix with an additional self-loop, used to maintain characteristics of the node itself; a diagonal matrix D is obtained by calculating degrees of the nodes, $$\tilde{D}^{-\frac{1}{2}} \tilde{A} \tilde{D}^{-\frac{1}{2}}$$

is used for normalizing A, and $W \in R^{C_l \times C_{l+1}}$ is a learnable weight matrix; and node neighbors perform feature aggregation through $$\tilde{D}^{-\frac{1}{2}} \tilde{A} \tilde{D}^{-\frac{1}{2}} X_t^{(l)},$$

and then functions are activated through σ to obtain output.

to aggregate the features of multi-order neighbor nodes of the skeleton, multi-order node connection is created, and high-order neighbors of the nodes are merged into the network; high-order neighbor information is obtained through $\tilde{A}_k$, where $\tilde{A}_k = A^k + I$; to solve the problem of excessive weights of local neighbors of the nodes caused by multi-scale aggregation of high-order polynomials, for a high-order adjacency matrix, $A_{i,j}$ greater than 1 is replaced with 1 to update an adjacency matrix $\hat{A}_k = 1(\tilde{A}_k \geq 1)$, whereby a multi-scale strategy is transformed into $$X_t^{(l+1)} = \sigma\left(\sum_{k=0}^{k} \hat{D}_{(k)}^{-\frac{1}{2}} \hat{A} \hat{D}_{(k)}^{-\frac{1}{2}} X_t^{(l)} W_{(k)}^{(l)}\right)$$

to eliminate the problem of excessive weighting of neighbor nodes, where k determines the size of scales, and $$\hat{D}_{(k)}^{-\frac{1}{2}} \hat{A}_{(k)} \hat{D}_{(k)}^{-\frac{1}{2}}$$

is a standardized nearest neighbor;

For a temporal attention mechanism, for any node $v \in V$, a time sequence vector $S_i \in S = \{s_1, \ldots, s_T\}$, query $q \in R^{d_q}$, key $k \in R^{d_k}$, and a value $v \in R^{d_v}$ exist. For the node $v_m$, the weight of a link between a $i^{th}$ frame and a $j^{th}$ frame can be evaluated through a dot product $\lambda_{ij}^m = q_i^m \cdot k_j^m \forall i, j$, $j=1, \ldots, T$. To obtain final temporal attention embedding of a node, firstly value vectors $v_j$ of all other frames are multiplied with corresponding evaluation scores $\lambda_{ij}$, then a product is scaled using a softmax function, and a weighted sum is calculated to obtain the temporal attention embedding $z_i^m \in R^{C'}$ of each node, where C' is the number of the output channels. Attention embedding is represented as:

$$z_i^m = \sum_j \text{softmax}_j \left( \frac{\lambda_{ij}^m}{\sqrt{d_k}} \right) v_j^m,$$

where $d_k$ is the dimension of a key sequence, and the evaluation score is divided by $\sqrt{d_k}$ to increase gradient stability. Before a self-attention module is input, firstly the outputs $\tilde{X} \in R^{B \times C \times T \times V}$ are converted into $\tilde{X} \in R^{BV \times T \times C}$, where B is a batch size of input, and in addition, the batch size B and the number V of joints are merged into one dimension. Then the transformed output is transferred to a self-attention block to obtain attention embedding. Then, a 2D convolutional network is used for performing temporal feature aggregation on each node with a window size of t.

Human behavior recognition at S3 specifically includes:

based on the human behavior recognition model trained in S2, the RGB camera is deployed in the production environment, video data in the production environment is acquired, the human skeleton in the videos is extracted by using the skeleton extraction API in the OpenPose, then the skeleton is input into the model, and predicted results are output.

Human-robot interaction at S4 specifically includes:

a human recognition model is based on python language, and the robot is based on an ROS system. A UDP protocol package in a Socket library is used to establish communication connection between a computer and the robot system. Action results predicted by a human recognition model at S3 are sent to the robot system at the same speed as video frame rate (30), UDP monitoring is established by the robot system, and category information sent by the computer is received. The robot makes interaction based on the category of human actions, and executes corresponding interaction actions, where the interaction actions of the robot are predefined.

Specific Embodiment 2

The application scenes of the patent mainly involve factories and other environments where collaborative robots and human partners participate in transportation of goods, in order to achieve the goal of liberating labor. A specific application scene lies in that in a factory or warehouse environment, robots and human partners participate in item handling tasks together. The robots acquire information about the surrounding environment, especially the human skeleton sequence through installation of cameras. The information will be input into the multi-scale graph convolutional neural network proposed in the patent for human behavior recognition. In this way, the robots can perceive the action intents of the human partners in real time, such as handing boxes forward by both hands. Neural network models can accurately judge a transportation intent of the human partners by recognizing human actions. Once obtaining action information and intents of the human partners, the robot will make corresponding interaction action plans based on predicted results. For example, based on predicted information, the robot judges that the human partner will move the box to a certain position, and the robot will move to the corresponding position in advance to receive the box from below.

Specific Embodiment 3

The human behavior recognition proposed in the present invention is based on classification of human skeleton sequences by the multi-scale graph convolutional neural network. The following is a specific explanation of an implementation process of the human behavior recognition:

(1) a dataset is acquired and a skeleton sequence is extracted: firstly, video data containing different human actions is acquired based on specific human-robot collaboration needs. Then, the human skeleton sequence is extracted from these videos through a skeleton extraction algorithm. The extracted skeleton sequence is labeled as specific action categories, and the dataset is divided into a training dataset and a testing dataset.

(2) A multi-scale graph convolutional neural network model is constructed: this step involves designing a multi-scale graph convolutional neural network that is specifically designed for processing structured data such as images or skeleton sequences. The multi-scale graph convolutional neural network can capture features in the images or the sequences at different scales, thereby better performing classification tasks.

(3) A neural network model is trained: the acquired skeleton dataset is input into the multi-scale graph convolutional neural network, and the network is trained through a backpropagation algorithm. In a training process, the neural network continuously optimizes parameters and weights to enable the model to more accurately recognize different categories of human actions. After training, a trained network model is obtained.

(4) Human behavior recognition: in practical applications, the human skeleton sequence acquired by the camera is input into the trained neural network model, and the neural network will output corresponding action category numbers to achieve recognition of human behaviors.

Specific Embodiment 4

A specific interaction process lies in that the neural network model transmits predicted human action categories to the robot system through a communication protocol. The robot system makes corresponding interaction actions (receiving the box from below) based on the actions of the human partners (such as handing the box forward by both hands). A movement process of the arms of the robot is as follows: firstly, based on human actions, a target point of actions of a mechanical arm is determined. Then, a motion trajectory is calculated through an interpolation algorithm, enabling the mechanical arm to smoothly reach the target position and complete the interaction action.

As the above is only a specific implementation of the present invention, the protection of the present invention is not limited to this. Any equivalent changes or substitutions of the technical features of the present technical solution that can be thought of by those skilled in the art shall fall within the scope of protection of the present invention.

What is claimed is:

1. The human-robot collaboration method based on a multi-scale graph convolutional neural network, comprising the following steps:

S1, data acquisition: acquiring a dataset of a human skeleton in human-robot collaboration scenes, and performing pre-processing to obtain pre-processed data;

S2, model training: loading the pre-processed data, and obtaining a human behavior recognition network model by training a multi-scale graph convolutional neural network, wherein in model training, constructing the multi-scale graph convolutional neural network comprises the following steps:

Step 1: a graph structure is constructed: the graph structure of skeleton data is constructed;

Step 2: a human behavior recognition network is constructed: the network contains 9 multi-scale spatio-temporal convolutional blocks, and each block contains a multi-scale spatial graph convolutional network and a temporal attention convolutional network;

Step 3:9 multi-scale spatio-temporal convolutional blocks: the first three multi-scale spatio-temporal convolutional blocks have 64 output channels, the next three multi-scale spatio-temporal convolutional blocks have 128 output channels, and the last three multi-scale spatio-temporal convolutional blocks have 256 output channels; and Step 4: action categories are predicted: outputting is performed by using global pooling, obtained tensors are input into a fully connected layer with the same number of output channels as the categories, and finally the action categories are predicted, wherein the graph structure of the skeleton data is constructed in the step of constructing the graph structure, the skeleton data is defined as a vector sequence consisting of two-dimensional coordinates of a skeleton of each frame, a skeleton graph is defined as G=(V,E), wherein a joint point set $V=\{V_1, \ldots, V_N\}$ represents a set of N joint points, the skeleton between the joint points is represented by undirected edges, and an edge set E is formed, representing the human skeleton structure; for an adjacency matrix $A \in R^{N \times N}$ of an undirected graph, when edges exist between the joint points $V_i$ and $V_j$, $A_{ij}=1$, or else $A_{ij}=0$;

human behavior consists of a set of skeleton sequences, thereby skeleton input is defined as a matrix: $X \in R^{T \times N \times C}$, wherein T is the number of frames of input videos, N is the number of joints (N=18), and C is a dimension of an eigenvector;

to aggregate information from adjacent nodes, spatial GCN of time t can be defined as:

$$X_t^{(l+1)} = \sigma\left(\tilde{D}^{-\frac{1}{2}} \tilde{A} \tilde{D}^{-\frac{1}{2}} X_t^{(l)} W^l\right),$$

wherein Ã=A+I is an adjacency matrix with an additional self-loop, used to maintain characteristics of the node itself; a diagonal matrix D̃ is obtained by calculating degrees of the nodes, $$\tilde{D}^{-\frac{1}{2}} \tilde{A} \tilde{D}^{-\frac{1}{2}}$$

is used for normalizing A, and $W \in R^{C_l \times C_{l+1}}$ is a learnable weight matrix: node neighbors perform feature aggregation through $$\tilde{D}^{-\frac{1}{2}} \tilde{A} \tilde{D}^{-\frac{1}{2}} X_t^{(l)},$$

and then functions are activated through σ to obtain output;

to aggregate the features of multi-order neighbor nodes of the skeleton, multi-order node connection is created, and high-order neighbors of the nodes are merged into the network: high-order neighbor information is obtained through $\tilde{A}_k$, wherein $\tilde{A}_k = A^k + I$; to solve the problem of excessive weights of local neighbors of the nodes caused by multi-scale aggregation of high-order polynomials, for a high-order adjacency matrix, $A_{i,j}$ greater than 1 is replaced with 1 to update an adjacency matrix $\hat{A} \ll =1$ ($\tilde{A}_k \geq 1$), whereby a multi-scale strategy is transformed into $$X_t^{(l+1)} = \sigma\left(\sum_{k=0}^{k} \hat{D}_{(k)}^{-\frac{1}{2}} \hat{A} \hat{D}_{(k)}^{-\frac{1}{2}} X_t^{(l)} W_{(k)}^{(l)}\right)$$

to eliminate the problem of excessive weighting of neighbor nodes, wherein k determines the size of scales, and $$\hat{D}_{(k)}^{-\frac{1}{2}} \hat{A}_{(k)} \hat{D}_{(k)}^{-\frac{1}{2}}$$

is a standardized nearest neighbor;

for construction of the temporal attention convolutional network in the human behavior recognition network, a temporal attention module is: for any node v E V, a time sequence vector $s_i \in S=\{s_1, \ldots, S_T\}$, query $q \in R^{d_q}$, key $k \in R^{d_k}$, and a value $V \in R^{d_v}$ exist;

for the node Um, the weight of a link between a $i^{th}$ frame and a $j^{th}$ frame can be evaluated through a dot product $\lambda_{ij}^m = q_i^m \cdot k_j^m \forall i, j=1, \ldots, T$;

to obtain final temporal attention embedding of a node, firstly value vectors $v_j$ of all other frames are multiplied with corresponding evaluation scores $\lambda_{ij}$, then a product is scaled using a softmax function, and a weighted sum is calculated to obtain the temporal attention embedding $z_i^m \in R^{C'}$ of each node, wherein C' is the number of the output channels;

attention embedding is represented as:

$$z_i^m = \sum_j \text{softmax}_j\left(\frac{\lambda_{ij}^m}{\sqrt{d_k}}\right) v_j^m,$$

wherein $d_k$ is the dimension of a key sequence, and the evaluation score is divided by $\sqrt{d_k}$ to improve gradient stability;

before a self-attention module is input, firstly the outputs $\tilde{X} \in R^{B \times C \times T \times V}$ are converted into $\hat{X} \in R^{BV \times T \times C}$, wherein B is a batch size of input, and in addition, the batch size B and the number V of joints are merged into one dimension;

then the transformed output is transferred to a self-attention block to obtain attention embedding; and then, a 2D convolutional network is used for performing temporal feature aggregation on each node with a window size of t;

S3, human behavior recognition: predicting human behaviors through a trained deep learning network model; and S4, human-robot interaction: sending predicted information to a robot system through a communication algorithm, and enabling a robot to make action plans based on the human behaviors.

2. The human-robot collaboration method based on a multi-scale graph convolutional neural network according to claim 1, wherein in data acquisition, a specific process of acquiring a dataset of a human skeleton in human-robot collaboration scenes is:

Step 1: data acquisition: shooting videos of different categories of human actions by using a RGB camera, and reducing a resolution of the obtained videos to 340*256 by a video processing algorithm, with a frame rate of 30 frames;

Step 2: converting video data: to expand the dataset, mirroring each dataset to obtain final human behavior video data;

Step 3: obtaining key points: extracting human skeleton data for each video by using skeleton extraction API provided by OpenPose, and labeling the category of each skeleton, where each human skeleton contains 18 key points; and Step 4: data classification: using 80% of the extracted skeleton data as a training dataset and 20% as a testing dataset.

3. The human-robot collaboration method based on a multi-scale graph convolutional neural network according to claim 1, wherein in human behavior recognition, a process of human behavior recognition is:

Step 1: recognizing a model: based on the human behaviors trained during model training, recognizing the model;

Step 2: acquiring video data: deploying the RGB camera to a production environment, and acquiring the video data from the production environment;

Step 3: extracting the human skeleton: extracting the human skeleton from the video by using the skeleton extraction API in the OpenPose; and Step 4: outputting predicted results: inputting the skeleton into the model and outputting the predicted results.

4. The human-robot collaboration method based on a multi-scale graph convolutional neural network according to claim 1, wherein a process of human-robot interaction is:

Step 1: language system: wherein a human recognition model is based on python language, and the robot is based on an ROS system;

Step 2: communication connection: using a UDP protocol package in a Socket library to establish communication connection between a computer and the robot system;

Step 3: data interaction: sending action results predicted by a human recognition model in human behavior recognition to the robot system at the same speed as 30 frames of video frame rate, establishing UDP monitoring by the robot system, and receiving category information sent by the computer; and Step 4: predefinition setting: enabling the robot to make interaction based on the category of human actions, and executing corresponding interaction actions, wherein the interaction actions of the robot are predefined.

\* \* \* \* \*